United States Patent
Hetrick et al.

(10) Patent No.: US 9,431,855 B1
(45) Date of Patent: Aug. 30, 2016

(54) TIMED CHARGE-UP AND ILLUMINATION

(71) Applicants: Westly Davis Hetrick, Atlanta, GA (US); Daniel Leland Bragg, Peachtree City, GA (US)

(72) Inventors: Westly Davis Hetrick, Atlanta, GA (US); Daniel Leland Bragg, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 155 days.

(21) Appl. No.: 14/222,023

(22) Filed: Mar. 21, 2014

Related U.S. Application Data

(63) Continuation of application No. 13/455,955, filed on Apr. 25, 2012, now Pat. No. 8,686,662.

(60) Provisional application No. 61/485,749, filed on May 13, 2011.

(51) Int. Cl.
*H02J 9/06* (2006.01)
*H02J 7/34* (2006.01)

(52) U.S. Cl.
CPC ............... *H02J 9/065* (2013.01); *H02J 7/345* (2013.01)

(58) Field of Classification Search
None
See application file for complete search history.

(56) References Cited

U.S. PATENT DOCUMENTS

| | | | | |
|---|---|---|---|---|
| 4,894,588 | A * | 1/1990 | Stack | H05B 39/09 315/224 |
| 5,144,207 | A | 9/1992 | Brunson | |
| 6,049,178 | A * | 4/2000 | Sheu | H02J 9/065 307/64 |
| 6,515,523 | B1 * | 2/2003 | Bikulcius | H03K 17/223 327/142 |
| 6,819,059 | B2 | 11/2004 | Block et al. | |
| 8,220,950 | B1 | 7/2012 | Sunshine | |
| 2004/0080282 | A1 * | 4/2004 | Block | H05B 41/34 315/241 S |
| 2008/0276892 | A1 * | 11/2008 | Doljack | F02N 11/0866 123/179.28 |

* cited by examiner

*Primary Examiner* — Crystal L Hammond
(74) *Attorney, Agent, or Firm* — King & Spalding LLP

(57) ABSTRACT

Exit and egress lighting, emergency lighting or emergency light fixture, having internal supercapacitor power sources are recharged after a power outage using a staggered power up process. For example, once an emergency light fixture detects a power-on transition from power being unavailable on a power source to power being available from the power source, the fixture waits a predetermined time to recharge a supercapacitor based on a charge time delay value. The predetermined time may be selected to be unique for one or several emergency light fixtures so as to distribute a combined peak power demand of the fixtures. After the predetermined time has expired, the supercapacitor is electrically coupled to a power source to in order to recharge the supercapacitor.

20 Claims, 6 Drawing Sheets

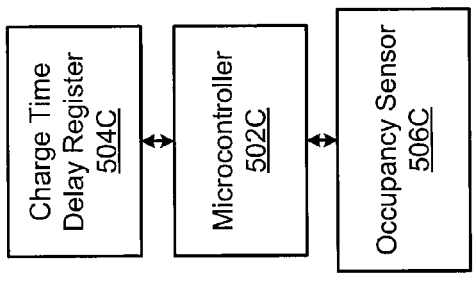
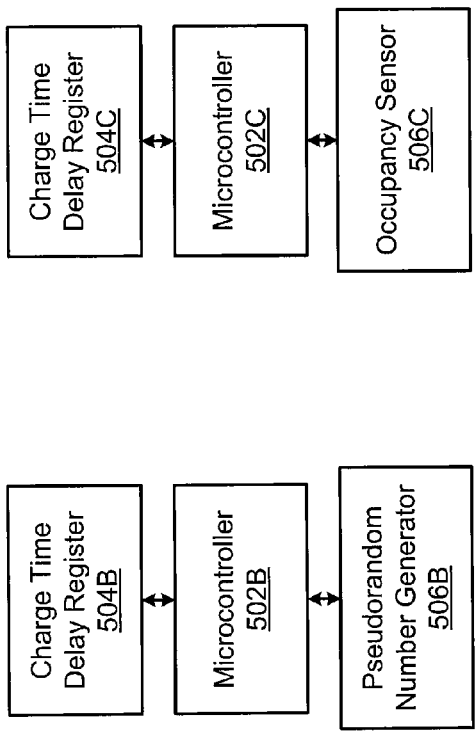
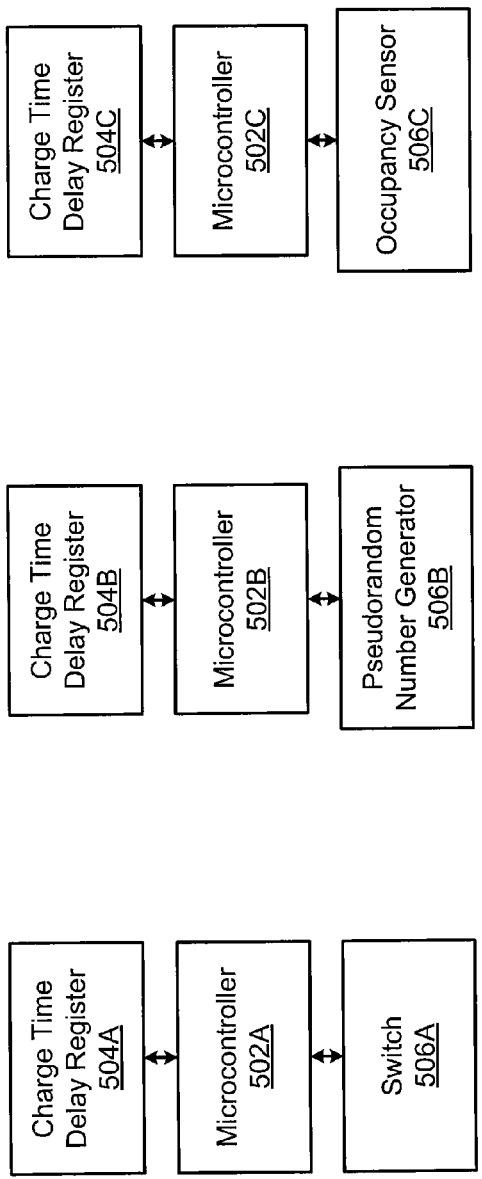
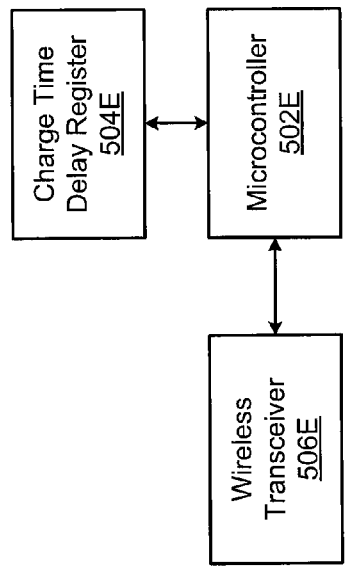
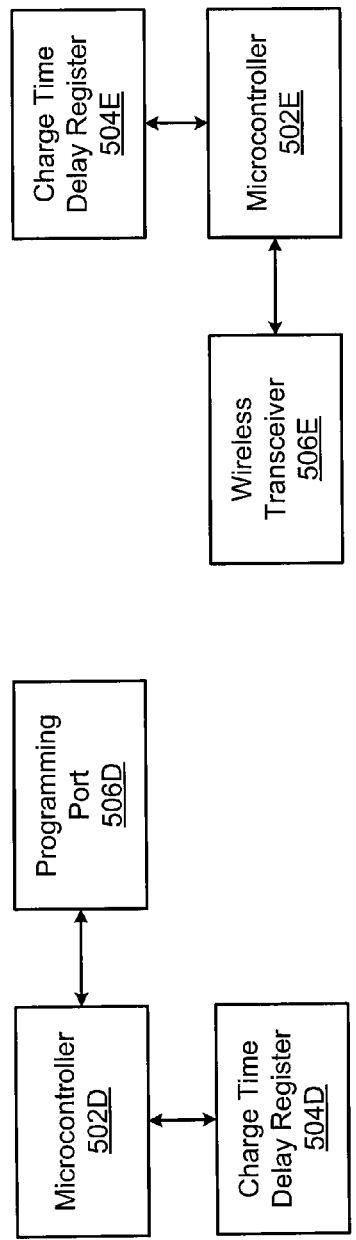

TIMED CHARGE-UP AND ILLUMINATION

RELATED PATENT APPLICATION

This application is a continuation application of and claims priority under 35 U.S.C. §120 to U.S. patent application Ser. No. 13/455,955, filed Apr. 25, 2012, and titled "Timed Supercapacitor Charge-Up And Emergency Illumination," which claims priority under 35 U.S.C. §119 to U.S. Provisional Patent Application Ser. No. 61/485,749, filed May 13, 2011, and titled "Charge Timer for Supercapacitor Backup Powered Emergency Lights and Exit Signs". The entire contents of both of the foregoing applications are hereby incorporated herein by reference for all purposes.

TECHNICAL FIELD

The present disclosure generally relates to emergency lights and exit signs and, more particularly, to controlling a charging start time for multiple emergency illumination apparatuses including emergency egress lights and exit signs, for example.

BACKGROUND

Backup power for emergency lighting fixtures such as emergency lights and exit signs has conventionally been provided by rechargeable batteries that are "trickle" charged when an alternating current (AC) line voltage is available. Generally, when the AC line voltage is lost during a power outage, for example, the batteries are used to supply power to light sources of emergency lighting fixtures. Typically, batteries are charged slowly to increase their life expectancy and avoid damage. Further, because of material limitations of general purpose rechargeable batteries, the batteries cannot be charged quickly even if desired. Thus, complete charge times for batteries in emergency lights and exit signs may be from about one to seven days. Even when several battery powered emergency lights are installed in a building, it is possible to charge the batteries in each of the emergency lights simultaneously without overloading the electrical distribution system of the building, because each of the emergency lights draws a relatively low amount of power for "trickle" charging.

Based on advances in materials science, supercapacitors stand to replace batteries as a power storage means in emergency lighting fixtures. Electric double-layer capacitors (EDLC) or supercapacitors (hereinafter referred to generally as supercapacitors) offer advantages and drawbacks over general purpose rechargeable batteries. For example, supercapacitors can be charged quickly without decreased lifetime expectancy or causing damage. Projected charge times for supercapacitors range from seconds to minutes for a full charge, as compared to hours or days for rechargeable batteries. For a comparable amount of power storage, the relatively quick charge time of a supercapacitor is attributed to a relatively high current draw, as compared to the "trickle" charge current draw for a rechargeable battery.

The relatively high current draw of supercapacitors presents a problem in many buildings such as office buildings, stores, shopping malls, theaters, and hospitals, for example, which generally include several backup powered emergency lighting fixtures. That is, if starting from a fully discharged state, the current draw required to charge several supercapacitor-powered emergency lighting fixtures may overload a building's power distribution system. Thus, to accommodate supercapacitor-powered emergency lighting fixtures, branch, feeder, and possibly even service circuits may need to be redesigned, retrofitted, or replaced to accommodate the large increase in peak current to charge the fixtures.

After several supercapacitor-powered emergency lighting fixtures are fully charged, their current demand returns to a normal level. However, a building's power distribution system would need sufficient capacity to handle the peak current demand required to simultaneously charge several discharged supercapacitors, even if the peak demand were expected to last only a few minutes. Thus, more robust and expensive wiring and distribution panel boards would be required to handle the supercapacitor charging energy spike (KVA peak demand), but would be unnecessary otherwise.

SUMMARY

According to one exemplary embodiments described herein, several supercapacitor-powered emergency lighting fixtures may be stagger-charged after to power failure. The stagger-charging of supercapacitors among several emergency lighting fixtures may be accomplished by each of the emergency lighting fixtures having a different preprogrammed time for charging its supercapacitor. As such, the charging of the several supercapacitors may be distributed in time, decreasing and distributing the peak energy demand. In certain embodiments, a charging priority can be set among several emergency lighting fixtures, based upon which of the emergency lighting fixtures are installed in critical or occupied locations, for example.

In one example embodiment, a method for timed supercapacitor charge-up and emergency illumination is described. The method can include detecting a power-on transition from power being unavailable on a power source to power being available from the power source. After detecting the power-on transition, a predetermined time can be waited according to a charge time delay value. After the predetermined time has expired, power from a power source can be coupled to a supercapacitor. The supercapacitor can then be charged with the power from the power source.

In another example embodiment, an apparatus for emergency illumination is described. The apparatus can include housing and at least one light source. A switch can be disposed within the housing and electrically coupled to a power source via a power distribution network. A supercapacitor can be disposed within the housing and electrically coupled to the switch and the light source. A charge time delay register can be disposed with the housing and can include a charge time delay value. A microcontroller can be disposed within the housing and can be configured to control the switch to electrically couple power from the power source to the supercapacitor based on the charge time delay value.

In still another embodiment, a system for emergency illumination is described. The system includes a power distribution network coupled to a power source. A plurality of emergency lighting fixtures are coupled to the power distribution network, each including a supercapacitor, a microcontroller, and a charge time delay register that stores a unique charge time delay value for the emergency lighting fixture. In certain embodiments, the microcontroller of each of the plurality of emergency lighting fixtures is configured to detect a power-on transition from power being unavailable on the power source to power being available from the power source. The microcontrollers are further configured to, after detecting the power-on transition, wait a predetermined time according to a unique charge time delay value. The predetermined time may be selected to be unique for one or several of the emergency lighting fixtures so as to distribute a combined peak power demand. After the predetermined time has expired, the microcontrollers are further configured to couple the power from the power source to the supercapacitors of the emergency lighting fixtures.

BRIEF DESCRIPTION OF THE DRAWINGS

For a more complete understanding of the present disclosure and the advantages thereof, reference is now made to the following description, in conjunction with the accompanying drawings briefly described as follows:

FIGS. 5A-5E illustrate respective example embodiments for setting a charge time delay value according to certain exemplary aspects described herein.

Figure 1:
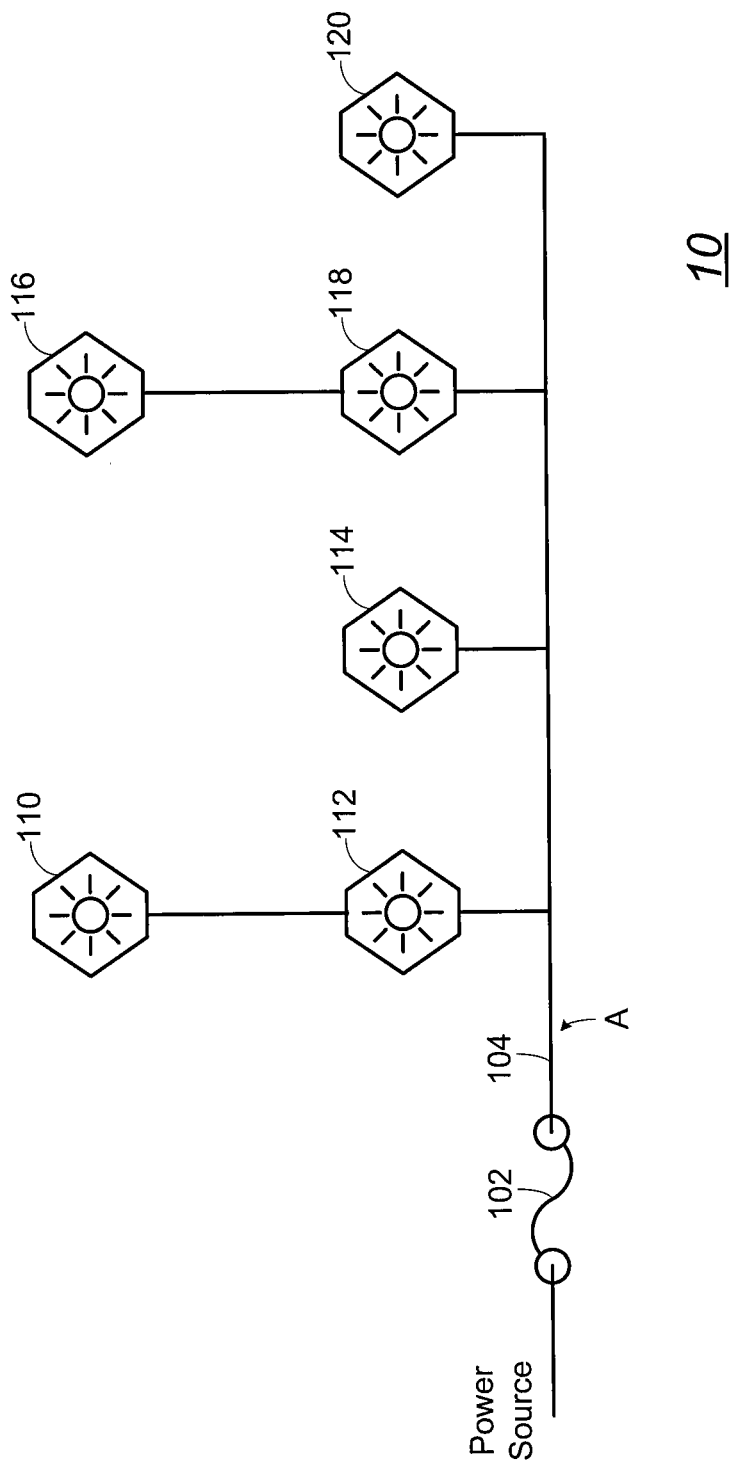
FIG. 1 illustrates an example embodiment of a supercapacitor-powered emergency lighting system.

The drawings illustrate only exemplary embodiments and are therefore not to be considered limiting of its scope, as other equally effective embodiments are within the scope and spirit of this disclosure. The elements and features shown in the drawings are not necessarily drawn to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

In the following paragraphs, the exemplary embodiments are described in further detail by way of example with reference to the attached drawings. In the description, well-known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Turning now to the drawings, in which like numerals indicate like, but not necessarily the same or identical, elements throughout, exemplary embodiments of the invention are described in detail. Turning to FIG. 1, an example embodiment of a supercapacitor-powered emergency lighting system 10 is described. The emergency lighting system 10 includes a power distribution network 104 and multiple supercapacitor-powered emergency lighting fixtures or apparatuses 110, 112, 114, 116, 118, and 120. As illustrated, the power distribution network 104 is electrically coupled to a power source, such as a power utility company, for example, via fuse 102. It is noted that the system 10 is provided by way of example only for discussion of aspects of the exemplary embodiments described herein, and one having ordinary skill in the art would recognize that the various embodiments described herein may be practiced with alternative configurations of the system 10.

In the system 10, each of the supercapacitor-powered emergency lighting fixtures 110, 112, 114, 116, 118, and 120 includes one or more light sources that illuminate an area or all or a portion of an exit sign, for example, and a supercapacitor that stores power in case of failure of the power source. The power distribution network 104 is electrically coupled to and supplies power to each of the supercapacitor-powered emergency lighting fixtures 110, 112, 114, 116, 118, and 120. In other words, the power distribution network 104 supplies power to illuminate the lights sources, when desired, and charge the supercapacitors of each of the emergency lighting fixtures 110, 112, 114, 116, 118, and 120, as necessary.

At point "A" on the power distribution network 104, the current requirements for each of the supercapacitor-powered emergency lighting fixtures 110, 112, 114, 116, 118, and 120 have combined, as would be readily understood by one having ordinary skill in the art. Especially if simultaneously charging each of the supercapacitors in the emergency lighting fixtures 110, 112, 114, 116, 118, and 120, the combined power draw at point "A" on the power distribution network 104 can be especially high and, in certain cases, may exceed the safe operating capacity or parameters of the power distribution network 104. The fuse 102 is selected such that, if an amount of current drawn over the power distribution network 104 dangerously exceeds the safe operating parameters of the network 104, it will "open" the connection between the power source and the network 104, preventing damage to the network 104. In the context described above, if simultaneously charging each of the supercapacitors in the emergency lighting fixtures 110, 112, 114, 116, 118, and 120 after a power-on event, the power draw at point "A" on the network 104 is likely to exceed the safe operating parameters of the network 104 and, consequently, the fuse 102 is likely to disconnect the power source from the network 104. It is noted that the disconnection of the power source from the network 104 by the fuse 102 is only one example of a result of operating the system 10 beyond its safe operating parameters. In various circumstances, operating the system 10 beyond its safe operating parameters may result in system damage or fire, for example.

Although resetting the fuse 102 to reconnect the power source to the network 104 may represent a relatively simple maintenance task, a regular or continuous trip (i.e., "opening") of the fuse 102 is an indication of a dangerous condition. For example, if retrofitting a building's systems to replace battery-powered emergency lighting fixtures with supercapacitor-powered emergency lighting fixtures, the building's original power distribution system may be unable to safely handle the peak power draw required to simultaneously charge each of the supercapacitors of the new emergency lighting fixtures. Because it may be too costly (or not cost-effective) to replace and/or upgrade a building's original power distribution systems when replacing emergency lighting fixtures, what is needed is a means to distribute the peak power draw required to charge multiple supercapacitor-powered emergency lighting fixtures, such as the emergency lighting fixtures 110, 112, 114, 116, 118, and 120.

According to aspects of the embodiments described below, each of the emergency lighting fixtures 110, 112, 114, 116, 118, and 120 distributes its power draw for charging over time, overcoming the need to replace and/or upgrade a building's original power distribution systems when retrofitting the building with the fixtures. That is, each fixture 110, 112, 114, 116, 118, and 120 is pre-set to or manually or electronically adjustably set to draw power for charging its supercapacitor at a respective different, unique, or staggered time, so the power requirements to charge each of the fixtures do not combine to a total greater than the safe operating parameters of the network 104. It is noted that, although each fixture 110, 112, 114, 116, 118, and 120 is generally configured to charge its supercapacitor at a respective different charge time, in certain exemplary embodiments, the charge times at least partially overlap in time, although being generally shifted in peak power draw. Further, among exemplary embodiments described herein, it is generally acceptable if two or more emergency lighting fixtures are set to charge their supercapacitors at a substantially same time, so long as the aggregate combination of the peak power demand from all the fixtures is sufficiently distributed over time so as not to overload the network 104.

Figure 2:
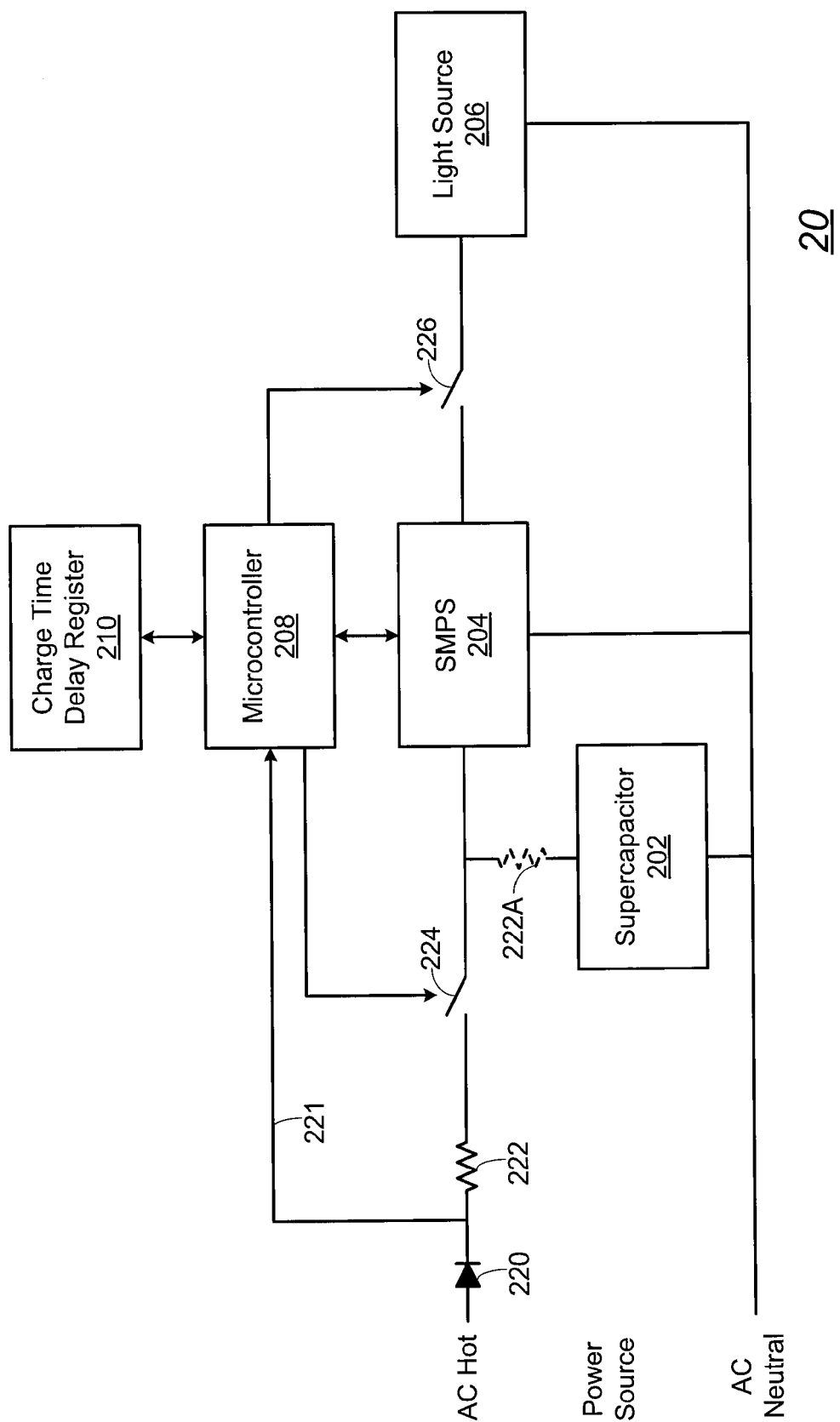
FIG. 2 illustrates an example schematic block diagram of a timed supercapacitor charge-up and emergency illumination apparatus according to one exemplary embodiment.

FIG. 2 is a schematic block diagram of a timed supercapacitor charge-up and emergency illumination apparatus 20 according to one exemplary embodiment. Now referring to FIG. 2, any of the emergency lighting fixtures 110, 112, 114, 116, 118, and 120 in FIG. 1 may be constructed in the manner of the exemplary emergency illumination apparatus 20. The emergency illumination apparatus 20 includes a supercapacitor 202, a switch mode power supply (SMPS) 204, a light source 206, a microcontroller 208, and a charge time delay register 210. The apparatus 20 further includes a rectifier 220, current limiting resistor 222, a first power switch 222, and a second power switch 226. The elements of the emergency illumination apparatus 20 can be disposed within a housing of the apparatus, in various exemplary embodiments. For example, the supercapacitor 202, switch mode power supply (SMPS) 204, microcontroller 208, charge time delay register 210, rectifier 220, current limiting resistor 222, first power switch 222, and second power switch 226 can be disposed within the housing. In various exemplary embodiments, the light source 206 can be disposed within or outside of the housing, depending upon the design of the emergency illumination apparatus 20.

In various exemplary embodiments, the rectifier 220 includes one or more power rectifiers electrically coupled to one or both of the "AC Hot" and "AC Neutral" lines of an input AC line voltage. In certain exemplary embodiments, the rectifier 220 is configured as a halfwave, fullwave, or bridge rectifier, for example. The rectifier 220 rectifies the input AC line voltage as would be understood by one having ordinary skill in the art. The current limiting resistor 222 is electrically coupled to the rectifier 220 and includes any suitable type of resistor that reduces or limits the current (i.e., charge) flowing into the supercapacitor 202 when the first power switch 224 is closed, especially when the supercapacitor 202 is fully discharged. The current limiting resistor 222 ranges in value from about 1 to 300 Ohms, for example, in various embodiments. It is noted that the particular configuration or electrical connections among the elements of the apparatus 20 may vary among embodiments. For example, the current limiting resistor 222 may be omitted in favor of the current limiting resistor 222A, which is electrically coupled between the supercapacitor 202 and the rectifier 220 but not between the rectifier 220 and the SMPS 204.

The first power switch 224 electrically couples the output of the rectifier 220 to the supercapacitor 202 and the SMPS 204. The second power switch 226 electrically couples the output of the SMPS 204 to the light source 206. The control of the first and second power switches 224 and 226 by the microcontroller 208 is described in further detail below. In various exemplary embodiments, each of the first and second power switches 224 and 226 includes an electrically-actuated switch such as a transistor or relay, for example, without limitation. Similarly, the other switches 322, 422, and 428, described below with reference to FIGS. 3 and 4, can include, but are not limited to, an electrically actuated switch such as a transistor or relay. In general, the switches 224, 226, 322, 422, and 428 be selected among any known electrically-actuated switches suitable for the application, as understood by those having ordinary skill in the art.

The exemplary supercapacitor 202 includes any general purpose supercapacitor such as an electric double-layer capacitor (EDLC) with relatively high energy density or a combination of several general purpose supercapacitors. In various exemplary embodiments, the supercapacitor 202 operates with a working voltage of a few volts or more and capacities of 4,000 to 6,000 farads, for example. However, the use of supercapacitors having other operating characteristics is within the scope and spirit of this disclosure. In certain exemplary embodiments, the supercapacitor 202 is selected such that it is capable of storing enough charge to illuminate the light source 206 for a sufficient amount of time if power is lost. As would be understood by those having ordinary skill in the art, however, the load presented by the light source 206 impacts the amount of time the supercapacitor 202 is capable of supplying sufficient power to illuminate the light source 206. For example, a light source 206 that provides a higher overall lumen output would be expected to discharge the supercapacitor 202 faster than a light source 206 that provides a lower overall lumen output.

In certain exemplary embodiments, the SMPS 204 includes any type of switch mode power supply such as a buck or boost converter. In that context, the SMPS 204 may include bulk and filter capacitors, filter inductors, and combinations of filter networks at its inputs and outputs, as well as isolation transformers, switching transistors, and other elements understood in the art as being components of switching power supplies. In operation, the SMPS 204 converts the rectified power from the power source to power having a potential or voltage suitable for operation of the light source 206, based on control signals from the microcontroller 208. For example, the SMPS 204 converts the rectified power from the rectifier 220 to power having a lower voltage than the rectified AC line voltage, which is 1.414 times the root mean square (RMS) value of the AC line voltage provided by the branch circuit (i.e., 120, 208, 240 VAC). In additional aspects, the SMPS 204 also convert the power or charge stored in the supercapacitor 202, which may be stored at a relatively low voltage, to power having a higher voltage. Examples of the light source 106 include one or more light sources such as light emitting diodes (LEDs), organic light emitting diodes (OLEDs), incandescent lamps, halogen lamps, or fluorescent lights, without limitation. Examples of LED light sources include discrete LEDs, chip on board LED, linear LED modules having multiple LEDs aligned in one or more rows, etc. When powered, the light source 106 provides light to illuminate an area such as an egress area, hallway, or room, for example, or all or a portion of an exit or other directional egress sign.

The microcontroller 208 can include any general purpose processor, computer, controller, Application Specific Integrated Circuit (ASIC), or Field Programmable Gate Array, for example. In certain exemplary embodiments, the microcontroller 108 is specially configured by firmware and/or the execution of software. In certain exemplary aspects, the microcontroller 108 detects a power-on transition from power being unavailable on the power source to power being available from the power source. That is, using the sense coupling 221, the microcontroller 208 detects whether power is available from the power source based on whether a rectified voltage is present at the output of the rectifier 220. Further, the microcontroller 208 detects when a transition occurs from power being unavailable on the power source to power being available from the power source. It is noted that the transition from power being unavailable on the power source to power being available from the power source may occur, for example, upon reconnection of power to branch circuits or upon power being restored after a power failure. Similarly, the transition from power being available on the power source to power being unavailable from the power source may occur, for example, upon disconnection of power to branch circuits or upon a power failure.

After detecting a power-on transition, the microcontroller 208 waits a predetermined or pre-set time according to a charge time delay value stored in the charge time delay register 210. The charge time delay register 210 stores a charge time delay value unique for the emergency illumination apparatus 20. After the predetermined time has expired, the microcontroller 208 controls the first power switch 224 to couple the rectified power from the rectifier 550 to the supercapacitor 202 for storage. In this context and with reference again to FIG. 1, it is noted that, when each of the emergency lighting fixtures 110, 112, 114, 116, 118, and 120, is manufactured similar to the emergency illumination apparatus 20, the fixtures each wait a unique or respective amount of time before charging. As such, the current requirements to charge each of the fixtures do not combine to a total greater than the safe operating parameters of the network 104 in the system 10.

When controlling the first power switch 224, the microcontroller 108 also couples the rectified power from the rectifier 220 to the SMPS 204. Using the rectified power, the microcontroller 208 controls the SMPS 204 to convert the rectified power from the rectifier 550 (or the power stored in the supercapacitor 202) to power having a potential suitable for operation of the light source 206. In turn, using the second power switch 226, the microcontroller 208 couples the power having the potential suitable for operation of the light source 206 from the SMPS 204 to the light source 206. For operation of the microcontroller 208 even when power is not available from the power source, the microcontroller 208 can be powered by a separate battery or power source, for example.

As described above, the exemplary SMPS 204 is controlled by the microcontroller 208. Particularly, by control of the SMPS 204, the microcontroller 208 is able to control a voltage and/or current supplied to the light source 206 for illumination. Depending upon the type of light source 206 (i.e., LED, incandescent, etc.), the SMPS 204 is configured to provide sufficient power to the light source 206 to illuminate it. Further, even as the charge on the supercapacitor 202 is withdrawn to illuminate the light source 206 during a power source failure, the SMPS 204 provides a substantially constant voltage to the light source 206. Additionally, the SMPS 204 regulates the power to the light source 206 by supplying an operating-adjusted amount of power to the light source 206 as its electrical properties may change from time to time, such as changing with temperature, for example. In other words, the SMPS 204 provides an operating-adjusted amount of power to the light source 206 so that the source does not become too hot or unstable. In certain exemplary embodiments, the SMPS 204 controls the power provided to the light source 206 according to variations in pulse width, slew rate, and/or on-off timings.

It is noted that the microcontroller 208 may control the various elements of the emergency illumination apparatus 20 based in-part upon the application of the emergency illumination apparatus 20. For example, for exit sign applications, the microcontroller 208, in certain exemplary embodiments, controls the SMPS 204 and the second power switch 226 to supply power to the light source 206 both when power is unavailable from the power source and when power is available from the power source. In other exemplary embodiments, for emergency lighting, such as egress or pathway lighting, and/or occupancy sensing applications, the microcontroller 208 controls the SMPS 204 and the second power switch 226 to supply power to the light source 206 only if a utility power failure occurs (i.e., power is unavailable from the power source) or movement is detected by a sensor or another controller electrically and/or communicably coupled to the microcontroller 208.

The charge time delay register 210 stores a "Unique" delay time before the supercapacitor 202 is charged after a power-on transition occurs. As noted above, in an exemplary embodiment, each emergency illumination apparatus 20 stores a unique delay time in its charge time delay register 210. In certain exemplary embodiments, the delay times are generally spaced so that only one emergency illumination apparatus 20 will draw a maximum current at any given time. In other words, the delay times are generally spaced to ensure that a first supercapacitor 202 (of a first emergency illumination apparatus 20) reaches a substantially full charge before any other supercapacitor 202 (of any other emergency illumination apparatus 20) starts charging. For example, the delay times of different emergency illumination apparatuses 20 are spaced in certain embodiments such that the charging of different supercapacitors 202 partially overlaps in time, although being generally shifted in peak power draw. As such, the current requirements do not combine to a total greater than the safe operating parameters of the network 104 in the system 10.

The charge time delay register 210 can be programmed in a number of different ways, as further described with reference to FIGS. 5A-5E below. In certain exemplary embodiments, the charge time delay register 210 is a register in the microcontroller 208, so no additional hardware is needed.

Figure 3:
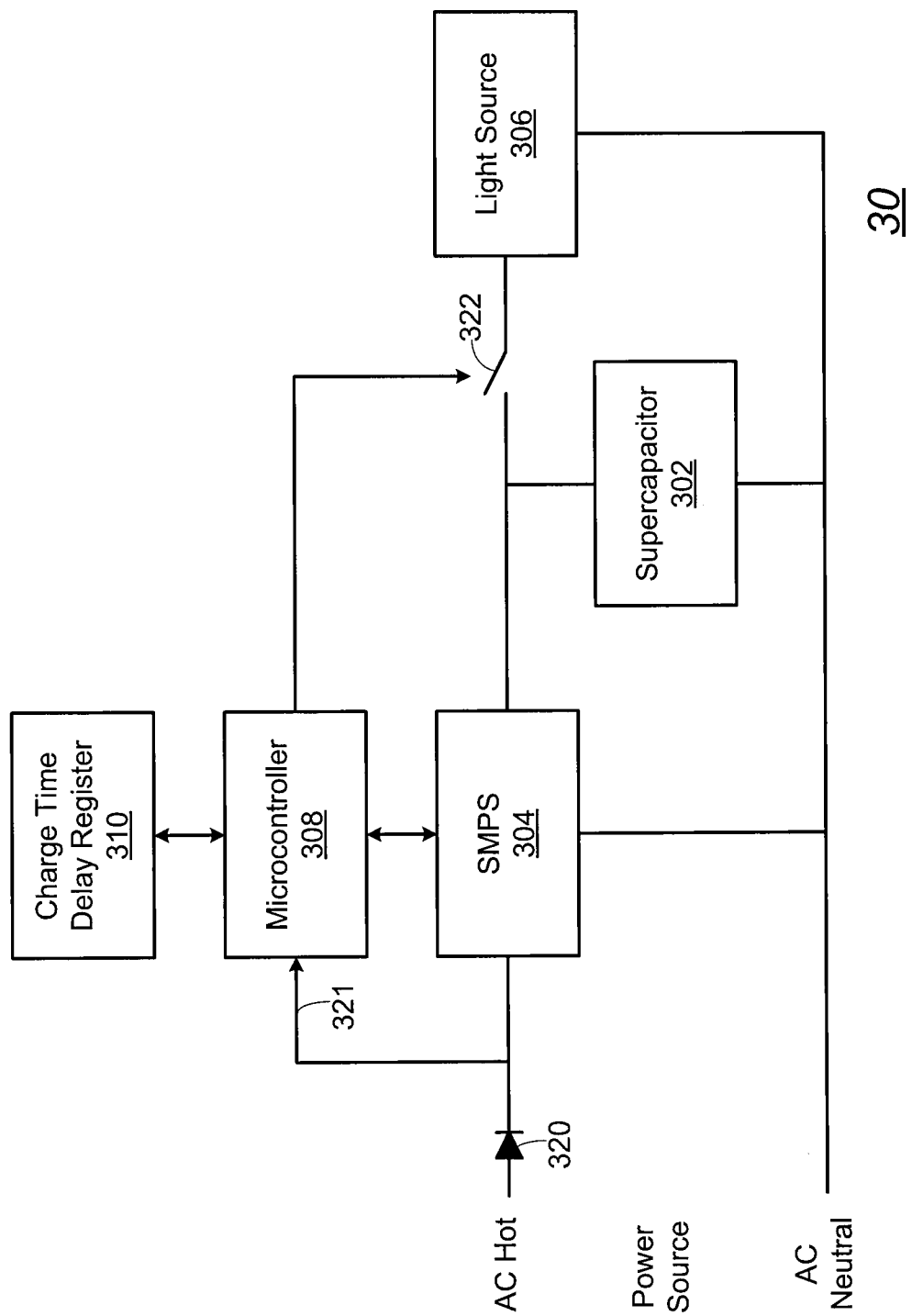
FIG. 3 illustrates an example schematic block diagram of a timed supercapacitor charge-up and emergency illumination apparatus according to another exemplary embodiment.

FIG. 3, is a schematic block diagram of a timed supercapacitor charge-up and emergency illumination apparatus 30 according to another exemplary embodiment. Now referring to FIG. 3, the emergency illumination apparatus 30 includes a supercapacitor 302, an SMPS 304, a light source 306, a microcontroller 308, and a charge time delay register 310. The apparatus 30 further includes a rectifier 320, and a power switch 322. It is noted that, while the circuit configuration of the emergency illumination apparatus 30 differs from that of the emergency illumination apparatus 20, the rectifier 320, the supercapacitor 302, the SMPS 304, the light source 306, and the charge time delay register 310 are similar to the rectifier 220, the supercapacitor 202, the SMPS 204, the light source 206, and the charge time delay register 210 described above with reference to FIG. 2. Taking into account the differences in circuit configuration of the apparatus 30 of FIG. 3 as compared to the apparatus 20 of FIG. 2, the exemplary microcontroller 308 controls the power switch 322 and the SMPS 304 accordingly.

The elements of the emergency illumination apparatus 30 can be disposed within a housing of the apparatus, in various exemplary embodiments. For example, the supercapacitor 302, switch mode power supply (SMPS) 304, microcontroller 308, charge time delay register 310, rectifier 320, and power switch 322 can be disposed within the housing. In various exemplary embodiments, the light source 306 can be disposed within or outside of the housing, depending upon the design of the emergency illumination apparatus 30. In the emergency illumination apparatus 30, the rectified power from the power source is coupled directly to the SMPS 304 without any intermediary current limiting resistor or switch, as compared to the emergency illumination apparatus 20. Further, the supercapacitor 302 is coupled to a node at the output of the SMPS 304 rather than at its input, as compared to the connections between the supercapacitor 202 and the SMPS 204 illustrated in FIG. 2.

In certain exemplary aspects, the microcontroller 308 detects power-on and power-off transitions from power being unavailable or available on the power source to power being available or unavailable, respectively, from the power source. That is, using the sense coupling 321, the microcontroller 308 detects whether power is available from the power source based on whether a rectified voltage is present at the output of the rectifier 320. Similarly, using the sense coupling 321, the microcontroller 308 detects whether power is unavailable from the power source based on whether no rectified voltage is present at the output of the rectifier 320. Further, the microcontroller 308 detects when a transition occurs from power being unavailable or available on the power source to power being available or unavailable, respectively, from the power source. It is noted that the transition from power being unavailable on the power source to power being available from the power source may occur, for example, upon reconnection of power to branch circuits or upon power being restored after a power failure. Similarly, the transition from power being available on the power source to power being unavailable from the power source may occur, for example, upon disconnection of power to branch circuits or upon a power failure.

In general, when power is available from the power source, the microcontroller 308 controls the SMPS 304 to supply power to charge or maintain the charge stored in the supercapacitor 302. Further, based on the control of the switch 322, the microcontroller 308 also controls the SMPS 304 to supply power to the light source 306. Because the microcontroller 308 is able to control the amount of power supplied at the output of the SMPS 302, based on pulse width modulation control of the SMPS 302, for example, the microcontroller 308 can control the amount and rate of power being supplied to the supercapacitor 302.

In certain exemplary embodiments, after detecting a power-on transition, the microcontroller 308 waits a predetermined or pre-set amount of time according to a charge time delay value stored in the charge time delay register 310. In certain exemplary embodiments, the charge time delay register 310 stores a charge time delay value unique for the emergency illumination apparatus 30. After the predetermined or pre-set time has expired, the microcontroller 308 is configured to control the SMPS 304 to convert the rectified power from the rectifier 320 into power to charge the supercapacitor 302. In this context and with reference again to FIG. 1, it is noted that, when each of the emergency lighting fixtures 110, 112, 114, 116, 118, and 120, is the same or substantially similar to the emergency illumination apparatus 30, the fixtures each wait a unique or respective amount of time before charging. As such, the current requirements to charge each of the fixtures do not combine to a total greater than the safe operating parameters of the network 104 in the system 10.

Further, using the rectified power from the rectifier 320, the microcontroller 308 controls the SMPS 204 to convert the rectified power to power having a potential suitable for operation of the light source 306. In turn, using the power switch 322, the microcontroller 308 is also configured to couple the power having the potential suitable for operation of the light source 306 from the SMPS 304 to the light source 306. For operation of the microcontroller 308 even when power is not available from the power source, the microcontroller 308 is capable of being powered by a separate battery or power source, for example.

It is noted that the microcontroller 308 may control the various elements of the emergency illumination apparatus 30 based in part upon the application of the emergency illumination apparatus 30. For example, for exit sign applications, the microcontroller 308, in certain exemplary embodiments, controls the SMPS 304 and the power switch 322 to supply power to the light source 306 both when power is unavailable from the power source and when power is available from the power source. Particularly, even when power is unavailable from the power source and cannot be provided by the SMPS 304, the microcontroller 308 can control the switch 322 to maintain a closed position, electrically coupling stored power from the supercapacitor 302 to the light source 306. In other exemplary embodiments, for emergency lighting, such as egress lighting, pathway lighting, or occupancy sensing applications, the microcontroller 308 controls the SMPS 304 and the power switch 322 to supply power to the light source 306 only if a utility power failure occurs (i.e., power is unavailable from the power source) or movement is detected by a sensor or another controller electrically and/or communicably coupled to the microcontroller 308.

Similar to the charge time delay register 210 of FIG. 2, the charge time delay register 310 of FIG. 3 stores a "unique" delay time before the supercapacitor 302 is charged after a power-on transition occurs. As noted above, in an exemplary embodiment, each emergency illumination apparatus 30 stores a unique delay time in its charge time delay register 310. The delay times are generally spaced so that only one emergency illumination apparatus 30 will draw a maximum current at any given time. In other words, the delay times are generally spaced to ensure that a first supercapacitor 302 (of a first emergency illumination apparatus 30) reaches a substantially full charge before any other supercapacitor 302 (of any other emergency illumination apparatus 30) starts charging. For example, the delay times of different emergency illumination apparatuses 30 are spaced in certain embodiments such that the charging of different supercapacitors 302 partially overlaps in time, although being generally shifted in peak power draw. As such, the current requirements do not combine to a total greater than the safe operating parameters of the network 104 in the system 10.

Figure 4:
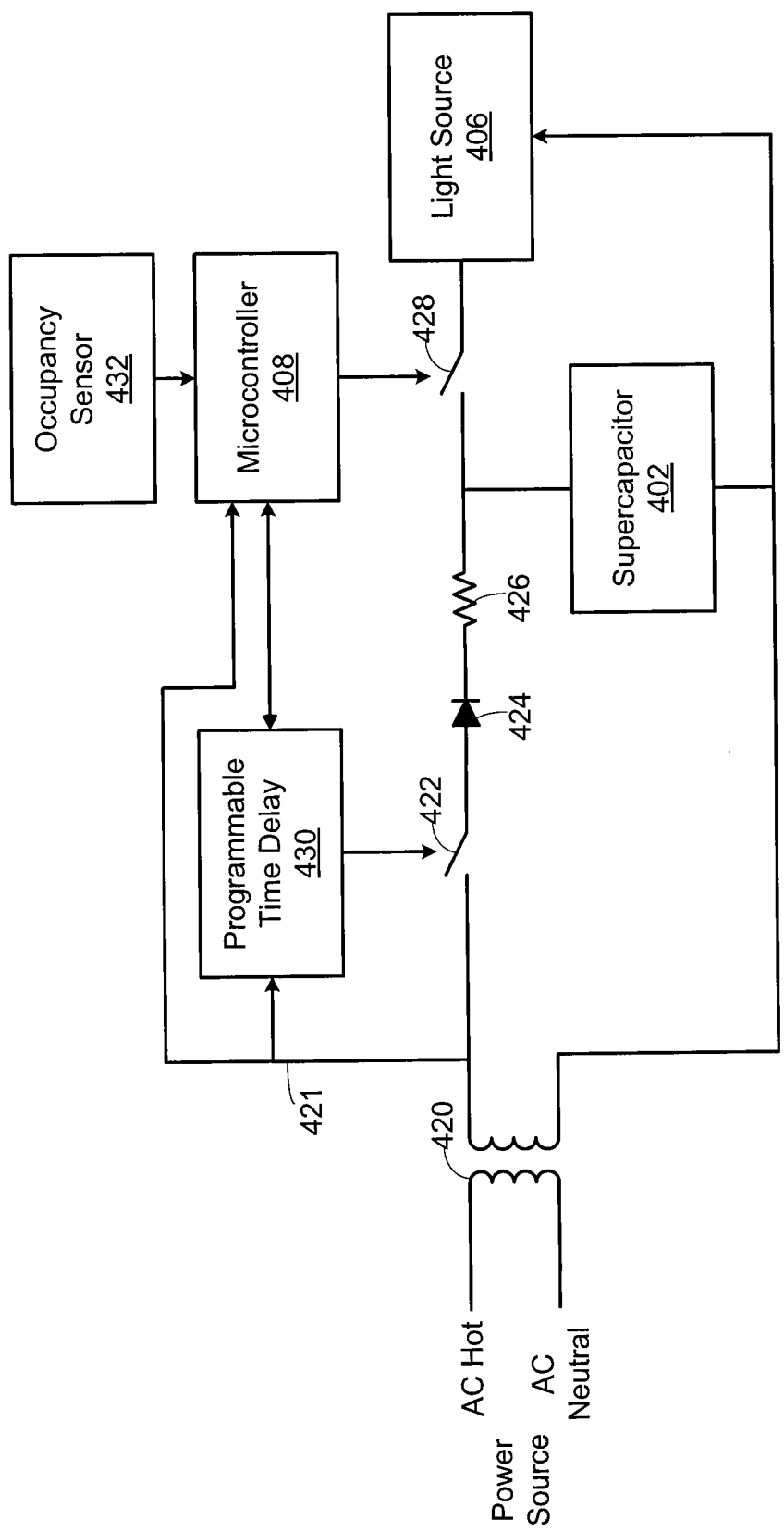
FIG. 4 illustrates an example schematic block diagram of a timed supercapacitor charge-up and emergency illumination apparatus according to still another exemplary embodiment.

FIG. 4 is a schematic block diagram of a timed supercapacitor charge-up and emergency illumination apparatus 40 according to still another exemplary embodiment. FIG. 4, the emergency illumination apparatus 40 includes a supercapacitor 402, a light source 406, a microcontroller 408, a programmable time delay 430, and an occupancy sensor 432. In various exemplary embodiments, the occupancy sensor 432 operates as a motion or similar sensor to determine whether a space such as a hallway, stairwell, or room, or any portion thereof is occupied. The apparatus 40 further includes a transformer 420, a first power switch 422, a rectifier 424, a current limiting resistor 426, and a second power switch 428. It is noted that, while the circuit configuration of the emergency illumination apparatus 40 differs from the emergency illumination apparatuses 20 and 30, certain elements of the emergency illumination apparatus 40 are similar to the corresponding elements in the emergency illumination apparatuses 20 and 30 described above with reference to FIGS. 2 and 3. Taking into account the differences in circuit configuration of the apparatus 40 of FIG. 4 as compared to the apparatuses 20 and 30 of FIGS. 2 and 3, the exemplary microcontroller 408 controls the second power switch 428 and the programmable time delay 430 accordingly.

The elements of the emergency illumination apparatus 40 can be disposed within a housing of the apparatus, in various exemplary embodiments. For example, the transformer 420, supercapacitor 402, microcontroller 408, programmable time delay register 430, rectifier 424, current limiting resistor 426, and power switch 428 can be disposed within the housing. In various exemplary embodiments, the light source 406 can be disposed within or outside of the housing, depending upon the design of the emergency illumination apparatus. The exemplary transformer 420 electrically isolates the remaining elements of the apparatus 40 from the power source while stepping down the AC line voltage provided by the power source to a stepped-down AC voltage. In certain embodiments, the transformer 420 is selected to provide a stepped-down AC voltage that is a certain ratio of the AC line voltage, such as one-tenth the AC line voltage, for example, without limitation. In the emergency illumination apparatus 40, the secondary side of the transformer 420 is electrically coupled to the first power switch 422, which is controlled by the programmable time delay 430, and the first power switch 422 is electrically coupled to the rectifier 424.

When the first power switch 422 is closed and power is available from the power source, rectified power output by the rectifier 424 is electrically coupled to the supercapacitor 402 via the current limiting resistor 426. The supercapacitor 402 is electrically coupled to the light source 406 via the second power switch 428. In certain exemplary aspects, the microcontroller 408 and the programmable delay 430 detect power-on and power-off transitions from power being unavailable or available on the power source to power being available or unavailable, respectively, from the power source. That is, using the sense coupling 421, the microcontroller 408 and the programmable delay 430 detect whether power is available from the power source based on whether a voltage is present at the secondary side of the transformer 420. Similarly, using the sense coupling 421, the microcontroller 408 and the programmable delay 430 detect whether power is unavailable from the power source based on whether no voltage is present at the secondary side of the transformer 420. Further, the microcontroller 408 and the programmable delay 430 detect when a transition occurs from power being unavailable or available on the power source to power being available or unavailable, respectively, from the power source. It is noted that the transition from power being unavailable on the power source to power being available from the power source may occur, for example, upon reconnection of power to branch circuits or upon power being restored after a power failure. Similarly, the transition from power being available on the power source to power being unavailable from the power source may occur, for example, upon disconnection of power to branch circuits or upon a power failure.

In certain exemplary embodiments, after detecting a power-on transition, the programmable time delay 430 waits a predetermined or pre-set time according to a predetermined or pre-set charge time delay value before closing the first power switch 422 and coupling power to the rectifier 424 and the supercapacitor 402. After detecting a power-off transition, the programmable time delay 430 opens the first power switch 422. In this manner, the supercapacitor 402 is not electrically coupled to the power source immediately upon a subsequent power-on transition. The programmable time delay 430 provides control to electrically couple and decouple the supercapacitor 402 from the power supply via the switch 422 in a manner similar to the control provided by the microcontrollers 208 and 308 of FIGS. 2 and 3. In the emergency illumination apparatus 40 of FIG. 4, however, the programmable time delay 430 is provided as an example of a circuit configuration where a circuit component or element other than a microcontroller controls the electrical coupling of power to a supercapacitor. In certain exemplary embodiments, the microcontroller 408 sets the predetermined charge time delay value of the programmable time delay 430. Alternatively, the predetermined charge time delay value of the programmable time delay 430 is set exclusively from the microcontroller 408.

In certain exemplary embodiments, the programmable time delay 430 waits a predetermined time after a power-on transition is detected. After the predetermined time has expired, the programmable time delay 430 closes the first power switch 422 to couple power to charge the supercapacitor 402. In this context and with reference again to FIG. 1, it is noted that, when each of the emergency lighting fixtures 110, 112, 114, 116, 118, and 120, is substantially similar to the emergency illumination apparatus 40, the fixtures each wait a unique or respective amount of time before charging. In other words, the delay times are generally spaced to ensure that a first supercapacitor 402 (of a first emergency illumination apparatus 40) reaches a substantially full charge before any other supercapacitor 402 (of any other emergency illumination apparatus 40) starts charging. For example, the delay times of different emergency illumination apparatuses 40 are spaced in certain embodiments such that the charging of different supercapacitors 402 partially overlaps in time, although being generally shifted in peak power draw. As such, the current requirements do not combine to a total greater than the safe operating parameters of the network 104 in the system 10.

In certain exemplary embodiments, the microcontroller 408 electrically couples the rectified power from the rectifier 424 and/or the power stored in the supercapacitor 402 to the light source 406 via control of the second power switch 428. It is noted that the microcontroller 408 may control certain elements of the emergency illumination apparatus 40 based in part upon the application of the emergency illumination apparatus 40. For example, for exit sign applications, the microcontroller 408 controls the second power switch 428 to supply power to the light source 406 both when power is unavailable from the power source and when power is available from the power source. In other exemplary embodiments, for emergency lighting and/or occupancy sensing applications, the microcontroller 408 controls the second power switch 428 to supply power to the light source 206 only if a utility power failure occurs (i.e., power is unavailable from the power source) or movement is detected by a sensor. Additionally, in certain exemplary embodiments, the microcontroller 408 controls the second power switch 428 based on motion detected by the occupancy sensor 432 regardless of whether power is available or unavailable from the power source.

The programmable time delay 430 operates the first power switch 422 with a "unique" delay time before electrically coupling the supercapacitor 302 to power from the power source after a power-on transition occurs. In an exemplary embodiment, each emergency illumination apparatus 40 operates with a unique delay time according to its programmable time delay 430. The delay times are generally spaced so that only one emergency illumination apparatus 40 will draw a maximum current at any given time. In other words, the delay times are generally spaced to ensure that a first supercapacitor 402 (of a first emergency illumination apparatus 40) reaches a substantially full charge before any other supercapacitor 402 (of any other emergency illumination apparatus 40) starts charging. In certain other exemplary embodiments, the delay times of different emergency illumination apparatuses 40 are spaced to at least partially overlap the charge of the supercapacitors 402 of the different emergency illumination apparatuses 40 in time, although being generally shifted in peak power draw. As such, the current requirements do not combine to a total greater than the safe operating parameters of the network 104 in the system 10. In certain exemplary embodiments, the programmable time delay 430 can be programmed in a number of different ways, as further described with reference to FIGS. 5A-5E below.

FIGS. 5A-5E, are examples for setting a charge time delay value according to certain exemplary embodiments. It is noted that the embodiments provided in FIGS. 5A-5E present alternative means to set and/or store a charge time delay value. However, the embodiments in FIGS. 5A-5E are provided by way of example only and other equivalent means are within the scope and spirit of this disclosure.

Referring now generally to FIGS. 5A-E and particularly to FIG. 5A, a switch 506A is electrically and/or communicatively coupled with the microcontroller 502A to program a desired charge time delay value to the charge time delay register 504A. For example, the switch 506A may include a bank of Dual Inline Position (DIP) switches or a potentiometer. Based on the settings of the switch 506A, which may be determined and manually adjusted by a person during installation, the microcontroller 502A sets a value of the charge time delay value stored in the charge time delay register 504A. In certain exemplary embodiments, the microcontroller 502A executes an algorithm to set the charge time delay value randomly based on the settings of the switch 506A. In other exemplary embodiments, the microcontroller 502A refers to a lookup table to set the charge time delay value based on the settings of the switch 506A. In still other exemplary embodiments, the microcontroller 502A calculates the value of the charge time delay value by using the settings of the switch 506A as a parameter of the calculation, or directly sets the value of the charge time delay value based on the settings of the switch 506A.

In FIG. 5B, a pseudorandom number generator 506B is electrically and/or communicatively coupled with the microcontroller 502B to program a desired charge time delay value to the charge time delay register 504B. Use of the pseudorandom number generator 506B in each of a plurality of supercapacitor-powered emergency lighting fixtures would provide automatic programming of substantially different charge time delay values in each of the fixtures. Again, the microcontroller 502B can use any pseudorandom number generated by the pseudorandom number generator 506B as a seed in an algorithm, as a pointer to a lookup table, or as an input parameter in a calculation for determining a value of the charge time delay value.

In FIG. 5C, an occupancy sensor 506C is electrically and/or communicably coupled to the microcontroller 502C and provides a control signal based on detected motion, for example, which is illustrative of occupancy. Based on the control signal provided by the occupancy sensor 506C, the microcontroller 502C sets or modifies the value of the charge time delay value in the charge time delay register 504C. In one exemplary embodiment, if the charge time delay value was predetermined to a first value and the occupancy sensor 506C provides an indication that a room or egress area is occupied, the microcontroller 502C reduces the charge time delay value to a value less than the first value. In another exemplary embodiment, if the occupancy sensor 506C provides an indication that a room or egress area is occupied, the microcontroller 502C "zeroes out" the charge time delay value, resulting in immediate supercapacitor charging.

In FIG. 5D, the microcontroller 502D is electrically and/or communicably coupled to a programming port 506D for programming the charge time delay value stored in the charge time delay register 504D. For example, a person with an external programmer such as a special application programmer, smart phone, portable personal computer, or tablet computer, for example, may interface with the programming port 506D to set the charge time delay value. In various exemplary embodiments, the programming port 506D may be an R-232/422 serial port, a Universal Serial Bus (USB) port, or an Infra-Red (IR) port, for example, without limitation.

The microcontroller 502E is electrically and/or communicably coupled to a wireless transceiver 506E for programming the charge time delay value stored in the charge time delay register 504E. Using the wireless transceiver 506E, the microcontroller 502E receives commands to update the value of the charge time delay value, and the commands can be coordinated among a plurality of emergency lighting fixtures in certain exemplary embodiments. For example, using the wireless transceiver 506E, the microcontroller 502E communicates with a control center that sends commands to multiple emergency lighting fixtures. Using special algorithms, the control center coordinates the multiple emergency lighting fixtures wirelessly so as to not overload power distribution, networks or to prioritize certain emergency lighting fixtures. The wireless transceiver 506E may operate using one or a combination of wireless networks such as WiFi, Zigbee, or Bluetooth, for example, without limitation.

Further, intercommunications between emergency illumination apparatuses supported by the wireless transceiver 506E can provide a means for cooperative sequential charging, with or without central control. Also, with building wide communications, charging of individual supercapacitors can be delayed until other loads have started and the metered electric service peak demand has returned to relatively normal levels. Thus, specific peak demand, current, and/or charge times could be specified for supercapacitor-powered emergency light fixtures wirelessly and individually.

Figure 6:
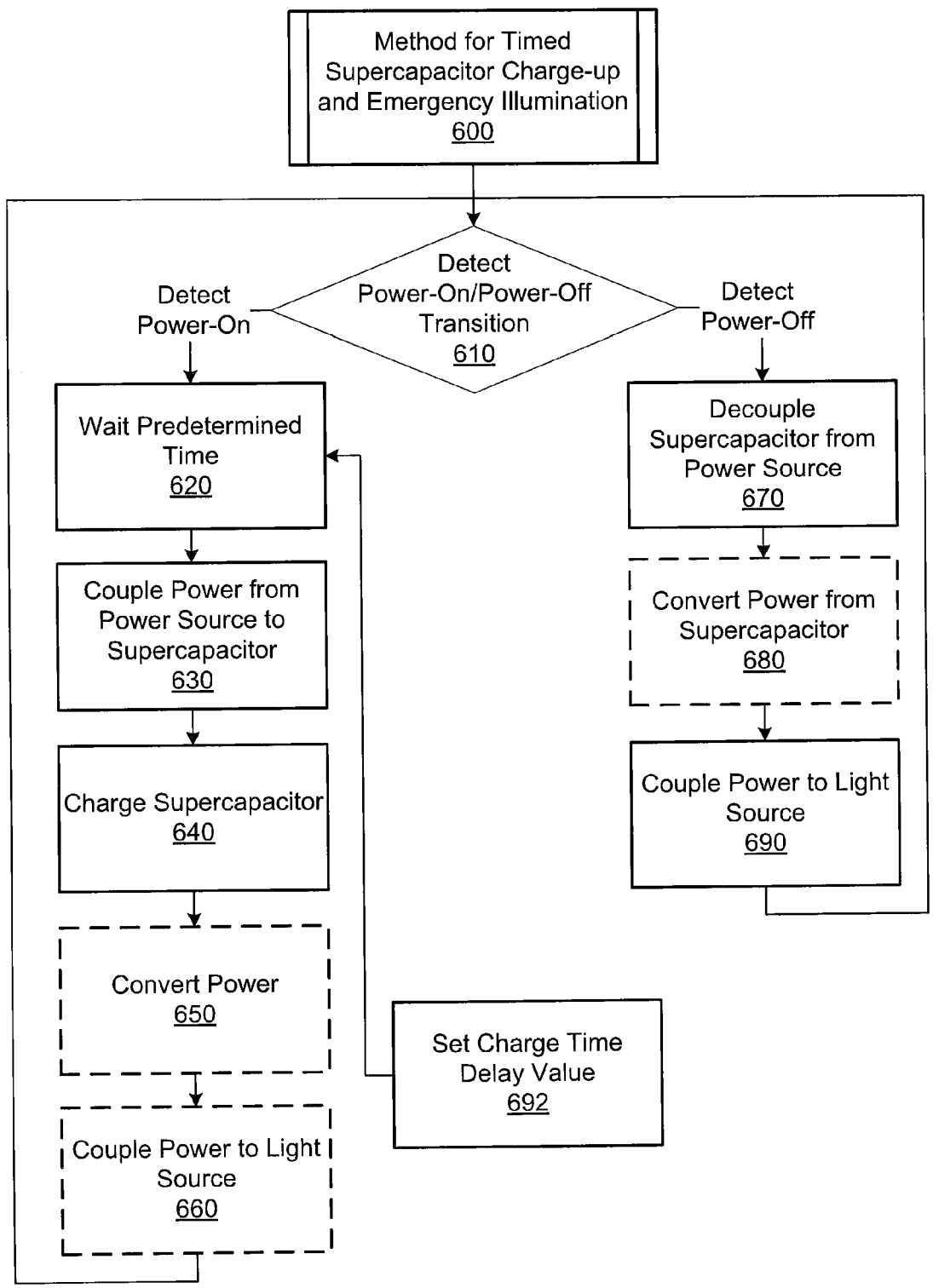
FIG. 6 illustrates an example embodiment of a method for timed supercapacitor charge-up and emergency illumination according to one exemplary embodiment.

Before turning to the process flow diagrams of FIG. 6, it is noted that the embodiments described here may be practiced using an alternative order of the steps illustrated in FIG. 6. That is, the process flows illustrated in FIG. 6 are provided as an example only and may be practiced using process flows that differ from those illustrated. Additionally, it is noted that not all steps may be required. In other words, one or more of the steps may be omitted or replaced, without departing from the spirit and scope of this disclosure. In alternative embodiments, steps may be performed in different orders, in parallel with one another, or omitted entirely, and/or certain additional steps may be performed without departing from the scope and spirit of this disclosure.

FIG. 6 is an example embodiment of a method 600 for timed supercapacitor charge-up and emergency illumination. Now referring to FIGS. 1-4 and 6, at the outset, it is noted that, although the method 600 is described with reference to certain ones of the example emergency illumination apparatuses 20, 30, and 40 of FIGS. 2-4, the method 600 can be performed by other equivalent emergency illumination apparatuses as would be understood by those having ordinary skill in the art.

Beginning at step 610, a determination is made as to whether a power-on or power-off transition has occurred. In certain exemplary embodiments, the microcontroller 208 detects whether a power-on or power-off transition has occurred on the power source using the sense coupling 221. If a power-on transition is detected, the detect power-on branch is followed to step 620, where the emergency lighting fixture waits a (unique) predetermined time according to the charge time delay value stored in the charge time delay register 210. For example, with reference to FIG. 2, the emergency illumination apparatus 20 waits a predetermined time after detecting a power-on transition according to a charge time delay value stored in the charged time delay register 210, as described above.

After the predetermined time has expired, the process continues to step 630, where the emergency illumination apparatus electrically couples power from a power source to a supercapacitor. In certain exemplary embodiments, with reference to the emergency illumination apparatus 20 of FIG. 2, after the predetermined time has expired, the microcontroller 208 controls the switch 224 to electrically couple the power from the power source (as rectified by the rectifier 220 and limited by the current limiting resistor 222) to the super capacitor 202. As another example, with reference to the emergency illumination apparatus 30 of FIG. 3, after the predetermined time has expired, the micro controller 308 controls the SMPS 304 to convert power from the power source and to provide the converted power to charge the super capacitor 302.

In step 640, the supercapacitor is charged by the electrically coupled power. As described above, because the amount of time waited at step 620 is unique for the emergency illumination apparatus from several other emergency illumination apparatuses, the power distribution network that supplies power to the apparatuses is not overloaded from its safe operating parameters. In certain embodiments, power is converted into power having a potential suitable for operating a light source in step 650. Additionally, at step 660, the power having the potential suitable for operation of the light source is electrically coupled to the light source at step 660. Referring to the emergency illumination apparatus 20 of FIG. 2, for example, at step 650, the microcontroller 208 controls the SMPS 204 to convert the power from the power source (and/or the super capacitor 202) to power having a potential suitable for operation of the light source 206. Further, at step 660, the microcontroller 208 electrically couples the power having the potential suitable for operation of the light source 206, as output from the SMPS 204, to the light source 206 by closing the second power switch 226. Alternatively, in another exemplary embodiment and with reference to the emergency illumination apparatus 30 of FIG. 3, at step 650, the microcontroller 308 controls the SMPS 304 to convert the power from the power source to power having a potential suitable for operation of the light source 306. Additionally, at step 660, the microcontroller 308 electrically couples the power having the potential suitable for operation of the light source 306, as output by the SMPS 304, to the light source 306 closing the power switch 322.

It is noted that, among certain exemplary embodiments, steps 650 and 660 are optional and may be omitted. Particularly, depending upon the use or application of the emergency illumination apparatus, the steps of converting power at step 650 and electrically coupling the power to a light source at step 660 are omitted if, after detecting a power-on transition, the emergency lighting apparatus does not illuminate any light source. For example, for certain applications such as emergency egress lighting, when power is provided by the power source, the emergency illumination apparatus does not illuminate the light source.

The process returns to step 610 to determine another power-on or power-off transition occurs. If a determination is made that a power-off transition has occurred, the detect power-off branch is followed to step 670, where the emergency illumination apparatus electrically decouples the supercapacitor from the power source. Referring to the emergency illumination apparatus 20 of FIG. 2 as an example, upon detection of a power-off transition at step 670, the micro controller 208 electrically decouples the supercapacitor 202 from the power source by opening the first power switch 224. As a different example, with reference to the emergency illumination apparatus 40 of FIG. 4, the programmable time delay 430 electrically decouples the supercapacitor 402 from the power source by opening the first power switch 422. As noted above, the decoupling of the supercapacitor from the power source insures that the supercapacitor is (at least initially) disconnected from the power source when the next power-on transition occurs and the power source is reconnected to power.

In step 680, power is converted from the supercapacitor to provide power for a light source. For example, with reference to the emergency illumination apparatus 20 of FIG. 2, the microcontroller 208 controls the SMPS 208 to convert power from the supercapacitor 202 to power having a potential suitable for operation of the light source 206. In other exemplary embodiments of emergency illumination apparatuses, the step of power conversion at 680 may be omitted. For example, with reference to the emergency illumination apparatus 40 of FIG. 4, power from the supercapacitor 402 is electrically coupled directly to the light source 406 without any conversion being necessary at step 680. It is noted that, in some embodiments, the light source 406 may include a separate LED driver, as discussed above, and the power stored in the supercapacitor 402 may be suitable for direct input to the LED driver.

Power is coupled to a light source to illuminate the light source at step 690. With reference to the emergency illumination apparatus 20 of FIG. 2, for example, the microcontroller 208 electrically couples the power output by the SMPS 204 to the light source 206 by closing the second power switch 226. As another example, with reference to the emergency illumination apparatus 30 of FIG. 3, the microcontroller 308 electrically couples the power stored in the supercapacitor 302 to the light source 306 by closing the power switch 322. As still another example, with reference to the emergency illumination apparatus 40 of FIG. 4, the microcontroller electrically couple the power stored in the supercapacitor 402 to the light source 406 by closing the second power switch 428 at step 690. After step 690, the process again proceeds back to step 610 to determine whether a power-on or power-off transition occurs.

In the exemplary method 600, the step of setting the charged time delay value 692 may occur at any time during the process flow. Particularly, changing or setting the charge time delay value at step 692 may be performed by any of the means illustrated and described with reference to FIG. 5A-5E. In other words, the charge time delay value stored in any one of the charge time delay register 210, the charge time delay register 310, or the programmable time delay 430, for example, may be set at step 692. In turn, the predetermined amount of time waited at step 620 is affected.

Although embodiments of the present invention have been described herein in detail, the descriptions are by way of example. The features of the invention described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

The invention claimed is:

1. A method for timed charge-up of a power storage device used with a light source, the method comprising:
    detecting a power-on transition corresponding to power from the power source being unavailable to the power from the power source being available;
    providing the power from the power source to a power storage device after waiting a time period from the detecting of the power-on transition; and
    charging the power storage device with the power from the power source.

2. The method of claim 1, further comprising
    detecting a power-off transition corresponding to the power from the power source being available to the power from the power source being unavailable; and
    decoupling the power source from the power storage device upon the detecting of the power-off transition.

3. The method of claim 2, further comprising coupling the power storage device to at least one light source upon the detecting of the power-off transition.

4. The method of claim 2, further comprising coupling the power storage device to at least one light source based on motion detection by a sensor.

5. The method of claim 1, further comprising
    detecting a power-off transition corresponding to the power being available to the power being unavailable; and
    upon the detecting of the power-off transition, converting, by a switch mode power supply (SMPS), backup power from the power storage device to converted power having a power level suitable for operation of at least one light source; and
    coupling the converted power to the at least one light source.

6. The method of claim 1, wherein the time period corresponds to one of a random number, a control signal from a sensor, or a control signal received via a wireless receiver.

7. The method of claim 1, wherein the power storage device is a supercapacitor.

8. The method of claim 1, wherein the power storage device is designed to provide backup power to a light source that provides emergency illumination.

9. An illumination apparatus, comprising:
    a housing;
    a switch disposed within the housing and coupled to a power source via a power distribution network;
    a power storage device disposed within the housing and coupled to the switch;
    a register disposed within the housing, wherein the register stores a charge time delay value; and
    a controller disposed within the housing, wherein the controller controls the switch to electrically couple the power source to the power storage device based on the charge time delay value.

10. The illumination apparatus of claim 9, wherein the controller is electrically coupled to the power source and is configured to:
    detect a power-on transition corresponding to power from the power source being unavailable to the power from the power source being available; and
    wait a time period from the detecting of the power-on transition before coupling the power source to the power storage device by controlling the switch, wherein the time period corresponds to the charge time delay value.

11. The illumination apparatus of claim 9, wherein the controller is electrically coupled to the power source and is configured to:
    detect a power-off transition corresponding to the power from the power source being available to the power from the power source being unavailable; and
    control the switch to decouple the power source from the power storage device upon the detecting of the power-off transition.

12. The illumination apparatus of claim 9, further comprising a pseudorandom number generator communicably coupled to the controller, wherein the controller is further configured to set the charge time delay value based on a random number generated by the pseudorandom number generator.

13. The illumination apparatus of claim 9, further comprising a sensor communicably coupled to the controller, wherein the controller is further configured to set the charge time delay value based on motion detected by the sensor.

14. The illumination apparatus of claim 9, further comprising a wireless receiver communicably coupled to the controller, wherein the controller is further configured to set the charge time delay value based on a command received via the wireless receiver.

15. The illumination apparatus of claim 9, further comprising a light source, wherein the controller is configured to electrically couple the power source to the light source.

16. The illumination apparatus of claim 9, wherein the power storage device is a supercapacitor.

17. The illumination apparatus of claim 9, wherein the power storage device is designed to provide backup power to the light source for providing emergency illumination.

18. An illumination system, comprising:
    a power distribution network coupled to a power source; and
    a plurality of lighting fixtures coupled to the power distribution network, wherein each respective lighting fixture of the plurality of lighting fixtures includes a power storage device, a controller, and a delay register that stores a charge time delay value for the respective lighting fixture and wherein the controller of each respective lighting fixture of the plurality of lighting fixtures is configured to:

detect a power-on transition corresponding to power from the power source being unavailable to the power from the power source being available; and couple the power source to the power storage device of the respective lighting fixture after waiting a respective time period from detection of the power-on transition by the controller of the respective lighting fixture, wherein the respective time period depends on the charge time delay value for the respective lighting fixture.

19. The illumination system of claim 18, wherein the charge time delay value for a first lighting fixture of the plurality of lighting fixtures is different from the charge time delay value for a second lighting fixture of the plurality of lighting fixtures.

20. The illumination system of claim 18, wherein the charge time delay value for the first lighting fixture is different from the charge time delay value for the second lighting fixture such that the power storage device of the first lighting fixture is substantially fully charged before the power storage device of the second lighting fixture is coupled to the power source.

* * * * *